(12) United States Patent
Fang et al.

(10) Patent No.: US 6,655,696 B1
(45) Date of Patent: Dec. 2, 2003

(54) SEAL CARRIER FOR A ROTARY MACHINE AND METHOD OF RETROFITTING

(75) Inventors: Biao Fang, Clifton Park, NY (US); Norman Arnold Turnquist, Sloansville, NY (US); Hamid Reza Sarshar, Clifton Park, NY (US); Mahmut Faruk Aksit, Istanbul (TR); Mark Edward Burnett, Buskirk, NY (US); Frederick George Baily, Ballston Spa, NY (US); Mehmet Demiroglu, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/064,282

(22) Filed: Jun. 28, 2002

(51) Int. Cl.[7] .............................. F16J 15/40; F16J 15/44
(52) U.S. Cl. ........................ 277/409; 277/411; 277/413
(58) Field of Search .................................. 277/355, 303, 277/305, 409, 411, 412, 413, 416, 419, 421, 422, 423, 911, 916, 929

(56) References Cited

U.S. PATENT DOCUMENTS

| | | | | |
|---|---|---|---|---|
| 3,294,243 A | * | 12/1966 | Cerles | 210/402 |
| 3,337,222 A | * | 8/1967 | Smith et al. | 277/350 |
| 3,722,895 A | * | 3/1973 | Mevissen | 277/583 |
| 4,650,340 A | * | 3/1987 | Krawczyk et al. | 366/220 |
| 5,002,288 A | * | 3/1991 | Morrison et al. | 277/413 |
| 5,425,543 A | * | 6/1995 | Buckshaw et al. | 277/350 |
| 5,487,549 A | * | 1/1996 | Dalton et al. | 277/413 |
| 5,603,510 A | * | 2/1997 | Sanders | 277/413 |
| 5,906,435 A | * | 5/1999 | Callaghan et al. | 366/220 |
| 6,244,599 B1 | * | 6/2001 | Braun et al. | 277/352 |
| 6,435,514 B1 | * | 8/2002 | Aksit et al. | 277/355 |

OTHER PUBLICATIONS

Caddet Energy Efficiency, "*Clearance Control System for a Steam Turbine*", JP 91.002/5X.FO5, Result 126, 4 pages, Feb. 1, 1993.

* cited by examiner

*Primary Examiner*—Anthony Knight
*Assistant Examiner*—Vishal Patel
(74) *Attorney, Agent, or Firm*—Paul J. DiConza; Patrick K. Patnode

(57) ABSTRACT

A seal carrier is provided for a rotary machine wherein the seal carrier comprises a packing ring coupled to a seal and wherein the packing ring comprises a channel disposed therein. In addition, a displacement apparatus is disposed in the channel for radially positioning the seal to control a flow of a fluid in a fluid path.

13 Claims, 3 Drawing Sheets

SEAL CARRIER FOR A ROTARY MACHINE AND METHOD OF RETROFITTING

BACKGROUND OF INVENTION

The present invention relates generally to rotary machines, and more particularly to an actuated seal for a rotary machine such as a steam or gas turbine.

Rotary machines include, without limitation, turbines for steam plants and compressors and turbines for gas plants. A steam turbine has a steam path that typically includes, in serial-flow relationship, a steam inlet, a turbine, and a steam outlet. A gas turbine has a gas path that typically includes, in serial-flow relationship, an air inlet, a compressor, a combustor, a turbine, and a gas outlet (also know as an exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine thereby leading to increased fuel costs. Also, steam-path leakage in the turbine area of a steam turbine, between the rotor of the turbine and the circumferentially surrounding casing, will lower the efficiency of the steam turbine thereby leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces of the casing that establish radial clearance between the seal and rotor but allow segments to move radially outward in the event of rotor contact. While labyrinth seals, singly or in combination with brush seals, have proved to be quite reliable, their performance degrades over time as a result of transient events in which the stationary and rotating components interfere, rubbing the labyrinth teeth into a "mushroom" profile and opening the seal clearance.

Accordingly, there is a need in the art for a rotary machine having good leakage control between stationary and rotating components.

SUMMARY OF INVENTION

One embodiment of the present invention comprises a seal carrier for a rotary machine. The seal carrier comprises a packing ring coupled to a seal wherein the packing ring comprises a channel disposed therein. In addition, a displacement apparatus is disposed in the channel for radially positioning the seal to control a flow of a fluid in a fluid path.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
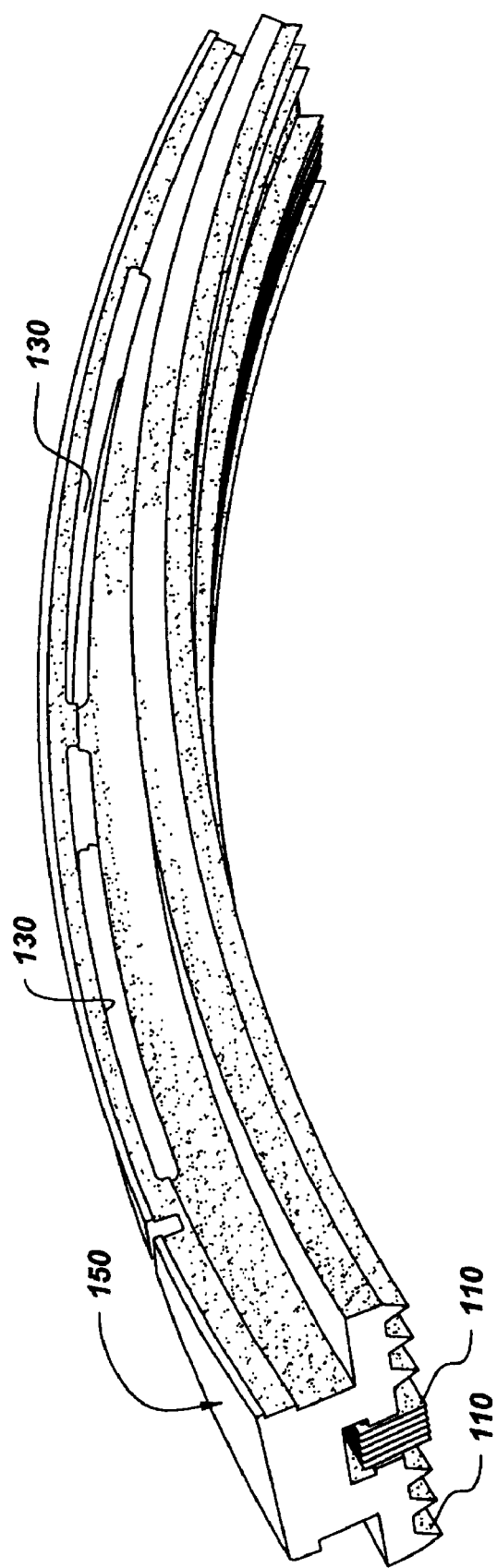
FIG. 1 is a perspective view of a seal carrier in accordance with one embodiment of the present invention.
Figure 2:
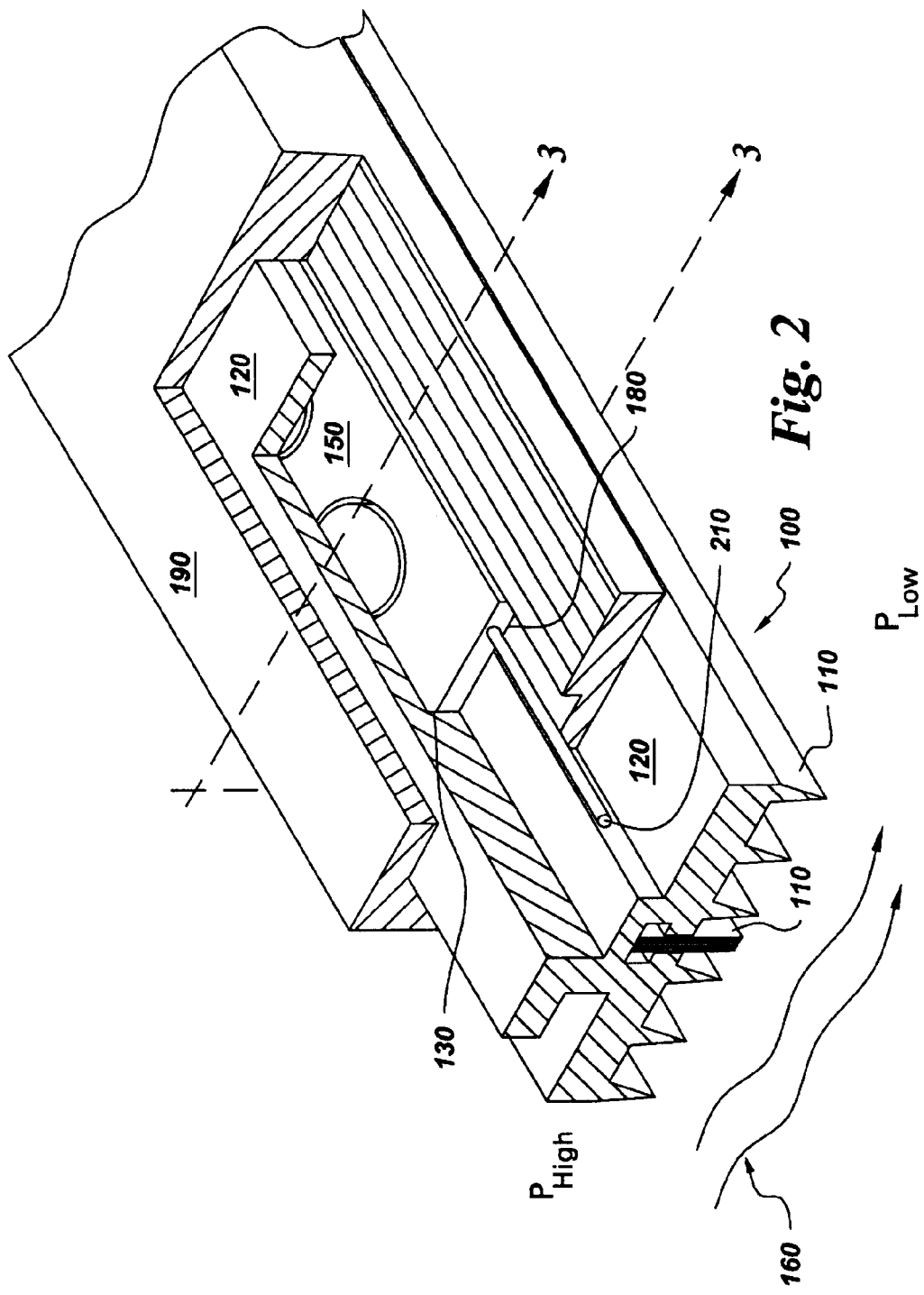
FIG. 2 is a top perspective cut-away-view of the seal carrier in FIG. 1.
Figure 3:
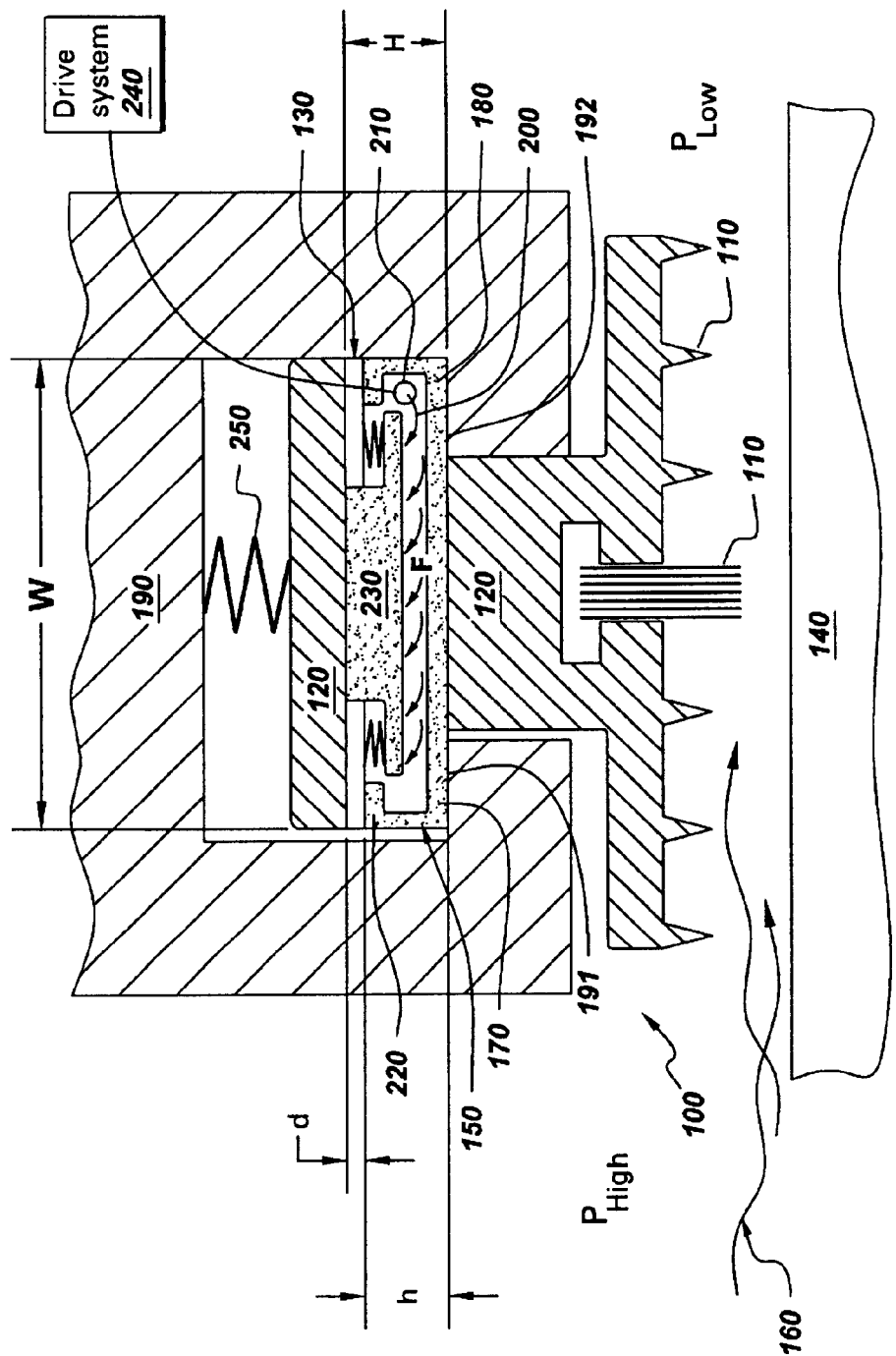
FIG. 3 is a schematic, cross sectional view of the seal carrier of FIG. 1 taken along lines 1—1.

A seal carrier 100 is provided for a rotary machine (see FIGS. 1 and 2). The rotary machine is typically selected from the group consisting of electric generators, steam turbines, gas turbines and x-ray tubes. In one embodiment, the seal carrier 100 typically comprises a (meaning at least one) seal 110 and a (meaning at least one) packing ring 120 coupled to the seal 110 wherein the packing ring 120 comprises a (meaning at least one) channel 130 disposed therein. The seal 110 is typically selected from the group consisting of brush seals, labyrinth seals, abradable seals, honeycomb seals, leaf seals, finger seals, ceramic seals, aramid seals and combinations thereof. For purposes of describing the invention, it is understood that the terminology "seal carrier 100" includes, without limitation, a segment of a seal carrier that is manufactured in segments that are arrayed together to form a complete seal carrier. The seal carrier 100 is coupled to a casing 190 that is disposed circumferentially around a rotor 140 (see FIG. 3). The casing 190 may, without limitation, be constructed as a single monolithic casing or a plurality of longitudinally-attached casing segments. The rotor 140 may, without limitation, be constructed as a single monolithic rotor or as two or more longitudinally-attached rotor segments. The rotor 140 typically comprises a generally longitudinally-extending axis (not shown), and the casing 190 is generally coaxially aligned with the axis. The casing 190 typically comprises the channel 130 which is generally coaxially aligned with the rotor 140.

In the abovementioned embodiment, the seal carrier 100 further comprises a (meaning at least one) displacement apparatus 150 disposed in the channel 130 for radially positioning the seal 110 to control a flow of a fluid 160 in a fluid path. The displacement apparatus 150 typically comprises, but is not limited to, a bellows, hydraulic cylinder, pneumatic device and combinations thereof. In addition, the fluid 160 typically comprises a gas. As used herein, the terms "thereon", "therein", "over", "above", "under", "on", "in" and the like are used to refer to the relative location of elements of the present invention as illustrated in the Figures and are not meant to be a limitation in any manner with respect to the orientation or operation of the present invention. The fluid 160 is disposed in a gap defined between the seal 110 and the rotor 140, wherein the fluid 160 has a pressure drop generally transverse to the gap, and wherein the pressure drop is generated during operation of the rotary machine. For illustrative purposes, it will be appreciated, however, that the fluid 160 in the fluid path flows from the high pressure side, designated "Phigh", towards the low pressure side, designated "Plow", i.e., from the left to right of drawing FIG. 3.

The channel 130 is disposed in the packing ring 120 for receiving the displacement apparatus 150 therein. The height of the channel 130 (designated "H") is typically defined by a height of the displacement apparatus 150 (designated "h") and an actuating distance (designated "d"). As used herein, the term "actuating distance" refers to a predetermined distance that the packing ring 120 and accompanying seal 110 are radially actuated when an actuating fluid 200 is introduced into the displacement apparatus 150. In some embodiments, the actuating fluid 200 typically comprises a gas or a liquid. The actuating distance "d" is typically in the range between about 0.0250 cm and about 0.635 cm. As a way of example and not limitation, the Figures show a channel 130 disposed in the packing ring 120; however, it will be appreciated that in other embodiments, the packing ring 120 comprises a plurality of channels for accepting a plurality of displacement apparatuses 150 therein.

The channel 130 is disposed in the packing ring 120 such that ends 170,180 of the displacement apparatus 150 abut the casing 190. As used herein, the term "abut" refers to the location of the ends 170,180 of the displacement apparatus 150 in which the ends 170,180 touch edges 191,192 of casing 190, respectively. In operation of the rotary machine, the actuating fluid 200 is introduced into the displacement apparatus 150 through a (meaning at least one) conduit 210. A force (designated "F" in FIG. 3) caused by the flow of the actuating fluid 200 into the displacement apparatus 150 serves to actuate the packing ring 120 and accompanying seal 110 radially outward. By having the channel 130 formed in the packing ring 120, the working area (defined as the area in which the displacement apparatus 150 and the packing ring 120 are disposed adjacent to each other) that may be used may encompass the entire width (designated "w") of the packing ring 120. As a result, the size (thereby affecting the area) of the displacement apparatus 150 may be varied to produce a required lifting force (Force=Pressure×Area) needed to radially actuate the packing ring 120. One aspect to increasing the working area in which the displacement apparatus 150 may operate is that the pressure (exerted by the actuating fluid 200) needed to actuate the displacement apparatus 150 may be decreased. However, utilizing the existing pressure and increasing the size of the displacement apparatus 150 will result in increasing the lifting force. For example, in operations where the displacement apparatus 150 is a bellows that comprises a housing 220 having a (meaning at least one) lifting button 230 disposed therein, the width of the lifting button 230 may be varied up to the entire width "w" of the packing ring 120 (thereby affecting the surface area of the lifting button 23) so as to produce the required lifting force needed to radially actuate the packing ring 120. Thus, by increasing the surface area of the lifting button 230, the force needed to actuate the displacement apparatus 150 and subsequently radially move the packing ring is increased. For example, in steam turbine operations, the pressure drop across the seal 110 is up to 500 psia and more specifically between about 50 psia and about 400 psia. In addition, the radially inward force (not shown) exerted on the packing ring 120 by the high pressure "Phigh" is in the range between about 50 lbs and about 5,000 lbs. As such, by varying the diameter of the lifting button 23 the lifting force (radially outward force) required to overcome the radially inward force caused by the high pressure "Phigh" in the turbine may be varied depending on a desired application. It will be appreciated that each of the displacement apparatuses 150 in the rotary machine are coupled to one another by the conduit 210.

A (meaning at least one) spring 250 typically exerts a radially inward force (not shown) to keep the packing ring 120 and accompanying seal 110, for example, disposed adjacent to the rotor 140 and allow some radially outward movement of the seal carrier 100 during transient events. As used herein, the term "transient events" refers to operating conditions resulting in radial displacement of the rotor 140, for example. The spring 250 typically comprises, but is not limited to, a leaf spring or coil spring. The spring 250 applies a radially inward force, when assembled in the rotary machine, that is typically in the range between about 2 and about 5 times the weight of the packing ring 120. In operation, the spring 250 only needs to provide enough radially inward force to seat the ends 170,180 of the packing ring 120 against the casing 190 and keep the packing ring 120 and accompanying seal 110 disposed adjacent to the rotor 140.

The introduction of the actuating fluid 200 into the displacement apparatus 150 is typically done by a drive system 240. The drive system 240 is provided for powering the displacement apparatus 150 so as to radially actuate the packing ring 120. In one embodiment, the drive system 240 comprises a pump. The pump typically comprises a gas pump, water pump, hydraulic pump or the like. In another embodiment, the drive system 240 comprises a canister having a compressed gas therein. It will be appreciated that the drive system 240 is typically manually or electrically actuated and the position of the drive system 240 is typically internal or external to the rotary machine. The drive system 240 may also create a negative pressure to withdraw the actuating fluid 200 from the displacement apparatus 150. As such, the drive system 240 serves to introduce and remove the working fluid thereby affecting the inward and outward radial displacement of the packing ring 120.

A method of retrofitting the rotary machine is provided and comprises providing the seal 110 and providing the packing ring 120. In this embodiment, the packing ring 120 is coupled to the seal 110 and comprises the channel formed therein 130 for accepting the displacement apparatus 150. The displacement apparatus 150 is coupled to the packing ring 120 for radially positioning the seal 110 to control the flow of the fluid 160 in the fluid path. In operation, the packing ring 120 is radially actuated when the actuating fluid 200 is introduced into the displacement apparatus 150. The displacement apparatus 150 is disposed in the channel 130 such that when the actuating fluid 200 is introduced, the displacement apparatus 150 forces the packing ring 120 radially outward at an actuating distance "d". In addition, the method of retrofitting the rotary machine comprises providing a drive system 240 for powering the displacement apparatus 150.

One aspect of such method of retrofitting the rotary machine is that by being able to radially move the packing ring 120 during operation, the life of the seal 110 is extended by moving the position of seal 110 and the packing ring 120 so as to reduce wear against the rotor 140. When the seal 110 comprises a brush seal, the life and performance of the brush seal bristles, singly or in combination with the abovementioned seals, for example, is increased due to the fact that the bristles do not continuously rub the rotor 140 at high speeds in cases when the rotor 140 is off-balance. Continuous rubbing causes the bristles of seal 110 to reach a melting temperature or to cause excessive wear on such bristles. When labyrinth seals are used, the performance of labyrinth seals, singly or in combination with the abovementioned seals, for example, degrade less rapidly over time because the teeth are less prone to break off or be rubbed into a "mushroom" profile thus maintaining an optimal seal clearance between the labyrinth seal and the rotor.

Another aspect to such method of retrofitting the rotary machine is that an existing packing ring 120 is simply removed and replaced with a replacement packing ring 120 having the channel 130 disposed therein. As such, down time of the rotary machine is reduced. A further aspect to such method of retrofitting is that displacement apparatuses 150 of various shapes and sizes may be disposed in the channel 130. As discussed above, in operations where the displacement apparatus 150 is a bellows that comprises the housing 220 having the lifting button 230 disposed therein, the size of the housing 220 and lifting button 230 may be varied to produce the required force needed to radially actuate the packing ring 120. In other operations, such method of retrofitting allows a technician to replace the packing ring 120 without having to disassemble any major parts of the rotary machinery thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall or within the true spirit of the invention.

What is claimed is:

1. A seal carrier for a rotary machine comprising:

a seal;

a packing ring coupled to said seal, said packing ring comprising a plurality of channels disposed therein;

a spring disposed adjacent said packing ring and disposed to provide a radial force to said packing ring; and a plurality of displacement apparatuses disposed in said plurality of channels for radially positioning said seal to control a flow of a fluid in a fluid path; wherein said displacement apparatuses are coupled by a conduit, said conduit disposed to provide a fluid medium to each of said displacement apparatuses, and wherein each of said displacement apparatuses comprises at least one return displacement mechanism disposed in said displacement apparatus to oppose a radial displacement force acting on said displacement apparatus by said fluid medium;

wherein said seal carrier is coupled to a casing such that ends of said displacement apparatuses abut said casing.

2. The seal carrier of claim 1 wherein said rotary machine is selected from the group consisting of electric generators, steam turbines, gas turbines and x-ray tubes.

3. The seal carrier of claim 1 wherein said seal is selected from the group consisting of brush seals, labyrinth seals, abradable seals, honeycomb seals, leaf seals, finger seals, ceramic seals, aramid seals and combinations thereof.

4. The seal carrier of claim 1 wherein each of said plurality of displacement apparatuses are selected from the group consisting of bellows, hydraulic cylinders, pneumatic devices and combinations thereof.

5. The seal carrier of claim 1 wherein an actuating distance of said packing ring is in the range between about 0.0250 cm and about 0.635 cm.

6. A seal assembly for a rotary machine comprising:

a seal;

a packing ring coupled to said seal, said packing ring comprising a plurality of channels disposed therein;

a spring disposed adjacent said packing ring and disposed to provide a radial force to said packing ring; and a plurality of displacement apparatuses disposed in said plurality of channels for radially positioning said seal to control a flow of a fluid in a fluid path; wherein said displacement apparatuses are coupled by a conduit, said conduit disposed to provide a fluid medium to each of said displacement apparatuses, and wherein each of said displacement apparatuses comprises at least one return displacement mechanism disposed in said displacement apparatus to oppose a radial displacement force acting on said displacement apparatus by said fluid medium; and a drive system coupled to each of said plurality of displacement apparatuses for powering said displacement apparatuses, wherein said seal assembly is coupled to a casing such that ends of said displacement apparatuses abut said casing.

7. The seal assembly of claim 6 wherein said rotary machine is selected from the group consisting of electric generators, steam turbines, gas turbines and x-ray tubes.

8. The seal assembly of claim 6 wherein said seal is selected from the group consisting of brush seals, labyrinth seals, abradable seals, honeycomb seals, leaf seals, finger seals, ceramic seals, aramid seals and combinations thereof.

9. The seal assembly of claim 6 wherein each of said plurality of displacement apparatuses are selected from the group consisting of bellows, hydraulic cylinders, pneumatic devices and combinations thereof.

10. The seal assembly of claim 6 wherein an actuating distance of said packing ring is in the range between about 0.0250 cm and about 0.635 cm.

11. The seal assembly of claim 6 wherein said seal assembly further comprises a spring disposed adjacent said packing ring and disposed to provide a radial force to said packing ring.

12. A method of retrofitting a rotary machine comprising:

providing a seal;

providing a packing ring, said packing coupled to said seal and wherein said packing ring comprises a plurality of channels for receiving a plurality of displacement apparatuses therein;

providing a plurality of displacement apparatuses disposed in said plurality of channels for radially positioning said seal to control a flow of a fluid in a fluid path; wherein said displacement apparatuses are coupled by a conduit, said conduit disposed to provide a fluid medium to each of said displacement apparatuses, and wherein each of said displacement apparatuses comprises at least one return displacement mechanism disposed in said displacement apparatus to oppose a radial displacement force acting on said displacement apparatus by said fluid medium;

wherein said seal carrier is coupled to a casing such that ends of said displacement apparatuses abut said casing.

13. The method of claim 12, further comprising providing a drive system for powering said displacement apparatuses.

* * * * *